United States Patent [19]

Grodecki et al.

[11] Patent Number: 4,793,743

[45] Date of Patent: Dec. 27, 1988

[54] AIR SEEDER PURGING SYSTEM

[75] Inventors: Lawrence S. Grodecki; Murray K. Just; James W. Henry; Glenn M. Hantke; Jack A. Lesanko, all of Yorkton, Canada

[73] Assignee: Morris Rod-Weeder Company Ltd., Yorkton, Canada

[21] Appl. No.: 44,049

[22] Filed: Apr. 29, 1987

[51] Int. Cl.⁴ .................. B65G 53/46; B65G 53/52; B65G 53/60

[52] U.S. Cl. .................. 406/123; 406/173; 406/182; 406/130

[58] Field of Search .................. 406/123, 53, 117–120, 406/122, 67, 68, 62–65, 127, 128, 130, 155, 164, 168, 171–173, 181, 182, 39–41, 1, 183; 222/139, 142, 279, 288; 111/34, 73, 77, 80; 234/654, 655

[56] References Cited

U.S. PATENT DOCUMENTS

| 445,390 | 1/1891 | Cosgrove | 406/173 |
|---|---|---|---|
| 1,125,032 | 1/1915 | Goodell | 406/168 X |
| 1,150,286 | 8/1915 | Middlestate | 406/173 X |
| 3,210,127 | 10/1965 | Schaben et al. | 406/65 |
| 3,414,329 | 12/1968 | Whitener | 406/183 X |
| 3,568,937 | 3/1971 | Gratoloup | 406/123 X |
| 4,296,695 | 10/1981 | Quanbeck | 406/123 X |
| 4,449,642 | 5/1984 | Dooley | 111/77 X |
| 4,473,016 | 9/1984 | Gust | 406/68 X |
| 4,514,114 | 4/1985 | Fuss et al. | 406/146 X |

FOREIGN PATENT DOCUMENTS

| 1179708 | 12/1984 | Canada. | |
| 287440 | 1/1971 | U.S.S.R. | 111/34 |

Primary Examiner—Sherman D. Basinger
Assistant Examiner—James M. Kannofsky
Attorney, Agent, or Firm—Hovey, Williams, Timmons & Collins

[57] ABSTRACT

The air seeder normally passes the contents of its hopper through metering devices that regulate the volume of materials moving into the transporting air streams of the machine, but the hopper is also provided with a series of normally closed drainage apertures which may be selectively opened when it is desired to rapidly dump the hopper contents instead of relatively slowly metering them to the air streams. When the apertures are opened, the hopper contents bypass the metering devices and gravitate directly into the air streams which can be quickly and easily diverted to a cyclone separator that exhausts the air from the streams and concentrates the particles for collection or storage.

14 Claims, 4 Drawing Sheets

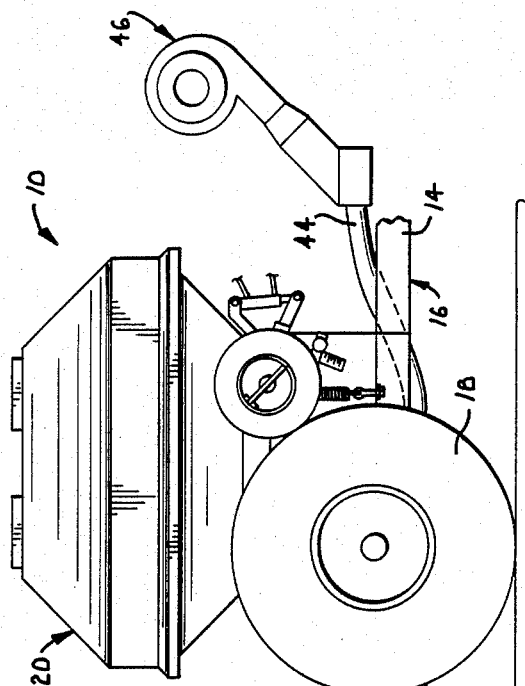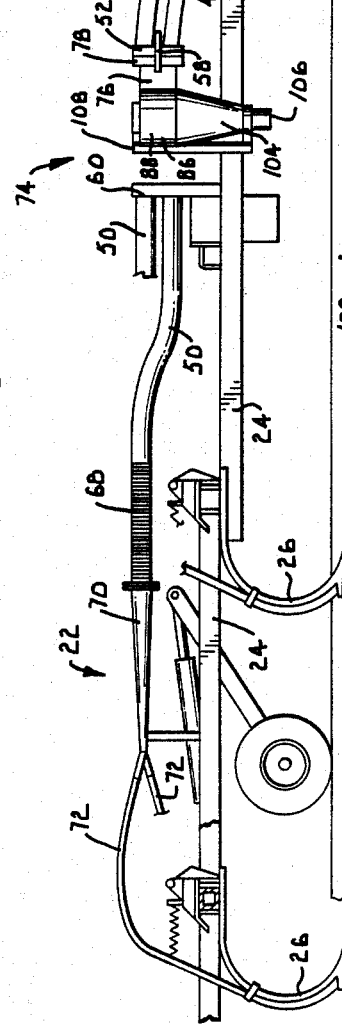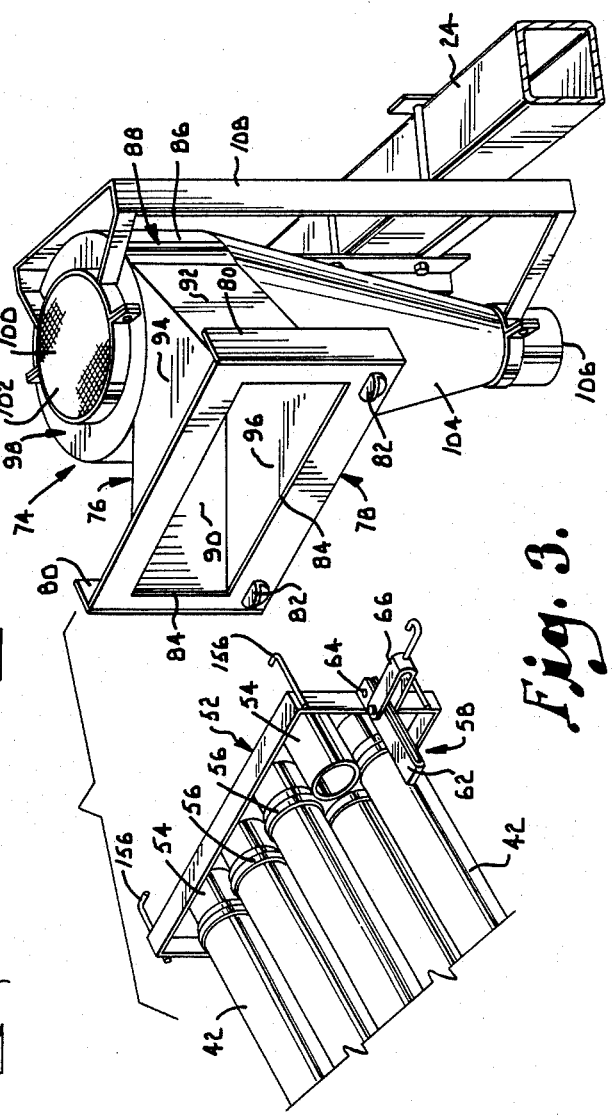
Fig. 2.
Fig. 3.

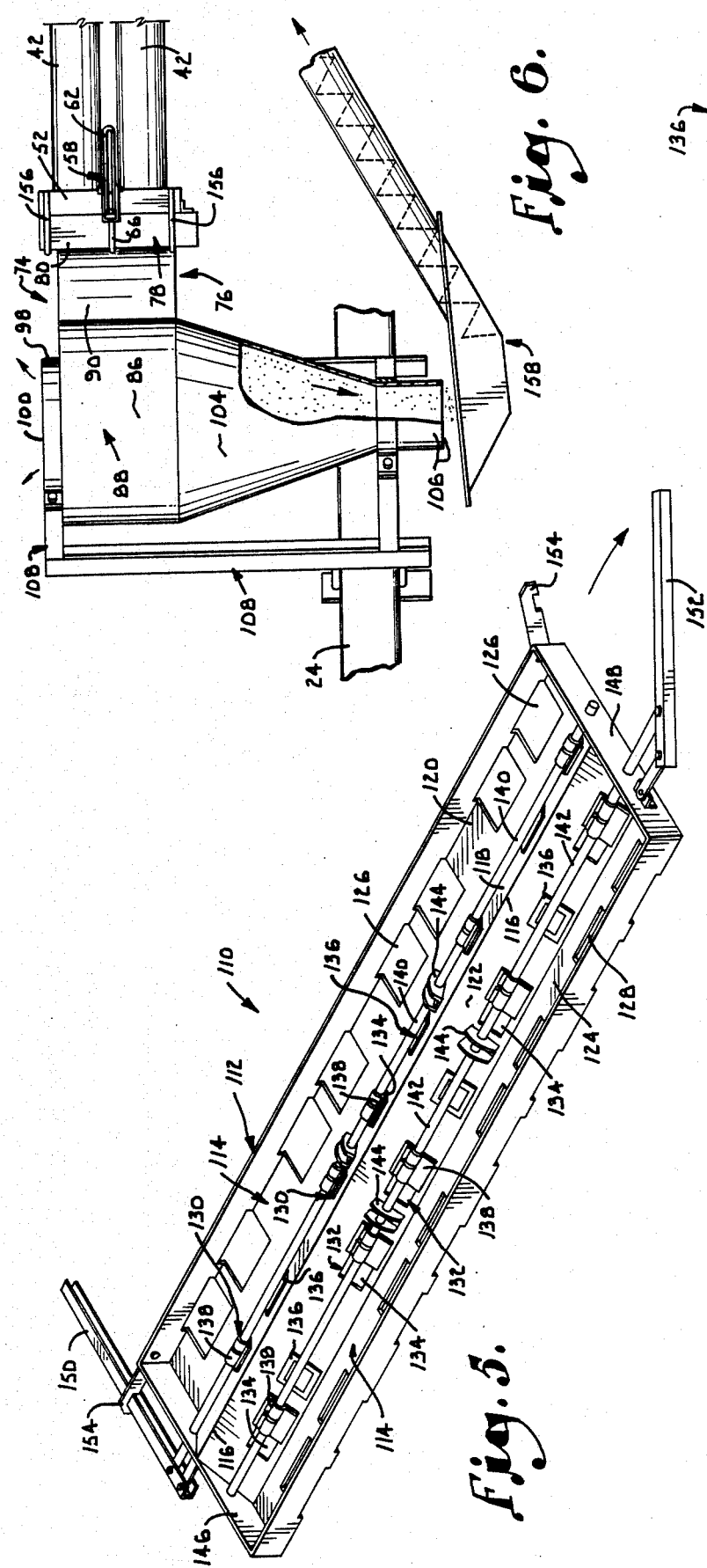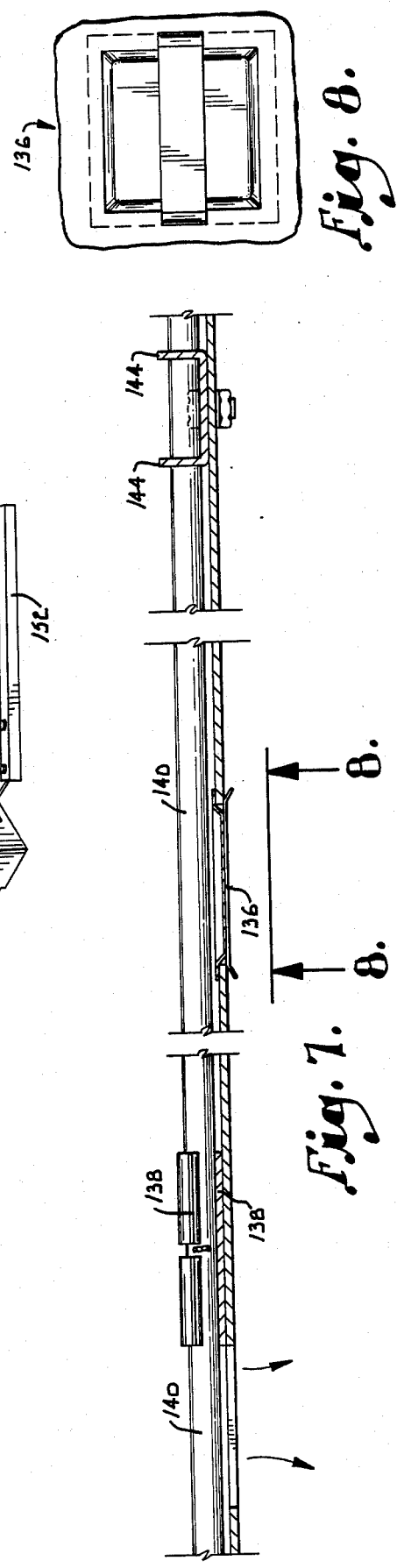

4,793,743

AIR SEEDER PURGING SYSTEM

BACKGROUND OF THE INVENTION

1. Field of the Invention

The present invention generally relates to agricultural seed planting equipment and, more particularly, to a system for quickly and effectively emptying the entire contents of the metering hopper of such a planter by bypassing the normal, slower operating metering mechanism of the machine and delivering the contents directly into the air transfer portion of the system which converges the separate discharge streams into a single point of collection.

2. Description of the Prior Art

Following utilization of an air seeder for the distribution of seeds and fertilizers across a field, there typically is an unspent supply of materials remaining within the hopper. Presently available air seeders typically provide for the removal of the unspent materials by having some sort of passage extending downwardly from the bottom of the hopper which may be opened for gravitational drainage of the unspent materials therethrough and to the ground.

Specific prior practices include an air seeder having a funnel-shaped hopper which has a bottom aperture that may be opened for draining the seeds from the hopper into a horizontal tube. During normal operation of the air seeder, an air blower forces a stream of air into the horizontal tube for carrying a metered stream of seeds rearwardly through the tube for ultimate distribution to the ground. During draining of seeds from the hopper, however, no air is forced through the tube. Instead, the tube has a bottommost door directly beneath the hopper which can be opened for gravitational drainage of the seeds from the tube to the ground.

The cited prior practice has a number of problems or shortcomings. The single aperture which permits direct gravitational drainage of seeds from the hopper would not be practical for air seeders which utilize a plurality of meters for delivering a plurality of metered streams from the hopper. Such air seeders require a corresponding plurality of tubes for transporting the seed streams from the hopper for ultimate distribution to the ground, and as a result typically require a wide bottomed hopper to accommodate the pluarlity of meters and the plurality of tubes utilized. A single drainage aperture would not be adequate to drain the entire width of the hopper due to the particulate nature of the seeds or granular fertilizer which tends to resist flow. Furthermore, a series of gravitational drainage apertures located across the width of the hopper bottom for direct drainage of the seeds from the air seeder would result in a series of spaced-apart streams that would be somewhat difficult to collect into one mass of seeds for storage.

Consequently, a need exists for improvements in air seeder clean out devices which will accommodate air seeders having a plurality of metered streams and which will permit easy collection of the drained seeds into one mass for storage.

SUMMARY OF THE INVENTION

Accordingly, the present invention provides an air seeder clean out system designed to satisfy the aforementioned needs and overcome the aforementioned shortcomings of the prior practices. The air seeder hopper of the present invention has a plurality of apertures located across the width of the bottom of the hopper which can be easily and simultaneously opened for gravitational drainage of the seeds from the hopper, into passages which bypass metering means, and into a corresponding plurality of transfer conduits wherein air streams entrain the seeds and carry them to a common collector. The downstream ends of the transfer conduits are conveniently grouped into a common unit for quick and easy movement from a normal position disposed for delivering materials to the trailing cultivator and an alternative seed collecting position wherein the grouped conduits are connected to a single high-efficiency cyclone separator which collects the seeds and discharges the air from the streams.

BRIEF DESCRIPTION OF THE DRAWINGS

In the drawings:

FIG. 2 is a fragmentary, side elevational view of the air seeder;

FIG. 3 is an enlarged, perspective view of a cyclone separator;

FIG. 5 is an enlarged, perspective view of a dump gate assembly;

FIG. 6 is an enlarged, fragmentary, side elevational view of the cyclone separator in communication with transfer conduits and shown delivering seeds to a receiving auger;

FIG. 7 is a fragmentary, cross-sectional view of the dump gate assembly taken along line 7—7 of FIG. 4; and FIG. 8 is a bottom view of a plug taken from line 8—8 of FIG. 7.

DETAILED DESCRIPTION OF THE INVENTION

Figure 1:
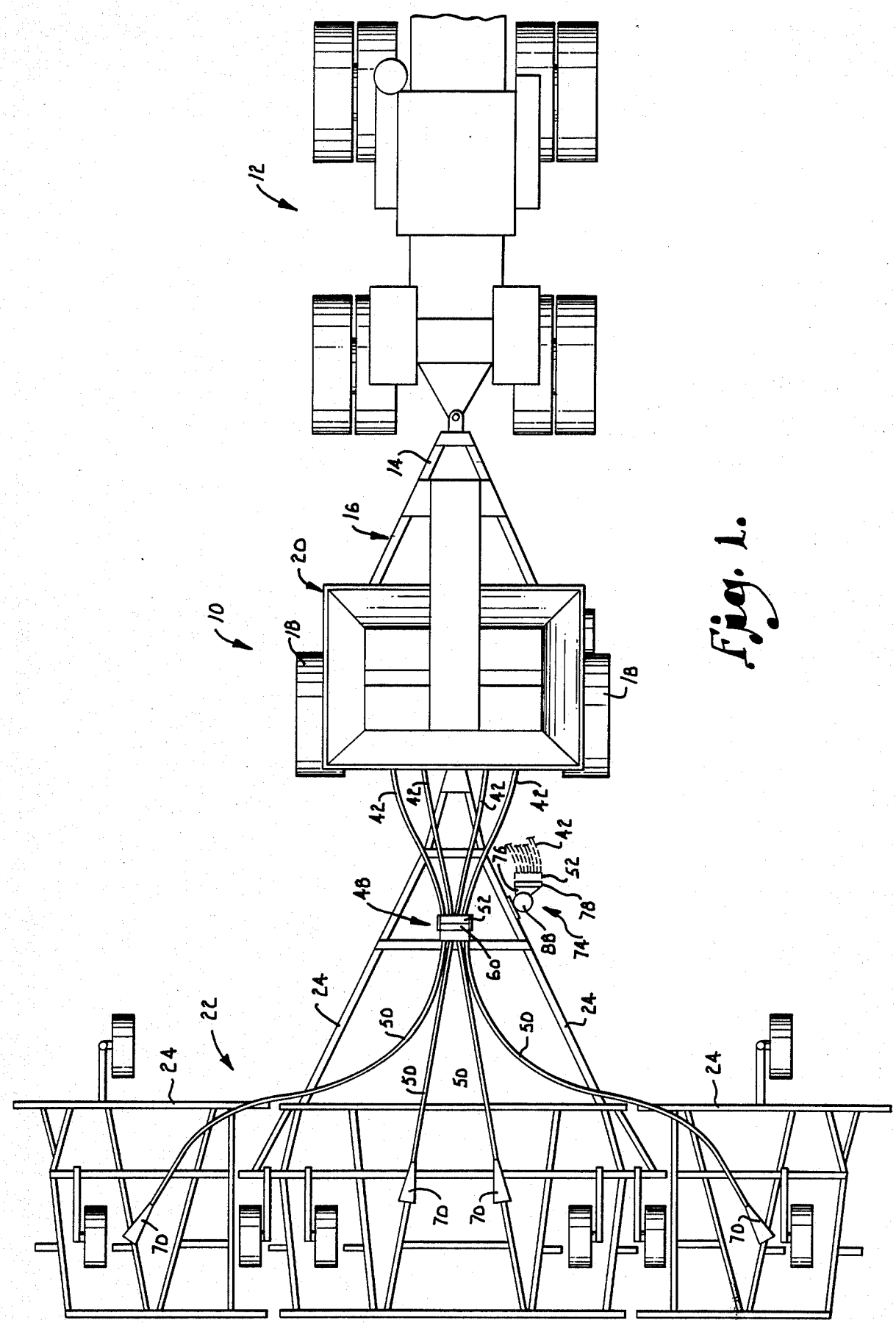
FIG. 1 is a top plan view of an air seeder made pursuant to the present invention.

A farm implement 10 as shown in FIG. 1, in the nature of an air seeder, is adapted for use with a towing tractor 12 and is attached to such a tractor by forwardly extending tongue 14 of a frame 16. Ground-engaging wheels 18 carry the frame 16 beneath a seed and fertilizer hopper 20. A field cultivator 22 having a wheeled frame 24 from which a plurality of openers 26 (FIG. 2) depend is pivotally attached (by means not shown) to the rear of the seeder frame 16 between ground wheels 18 of frame 16 to permit the seeder-cultivator assembly to articulate during turns.

Figure 4:
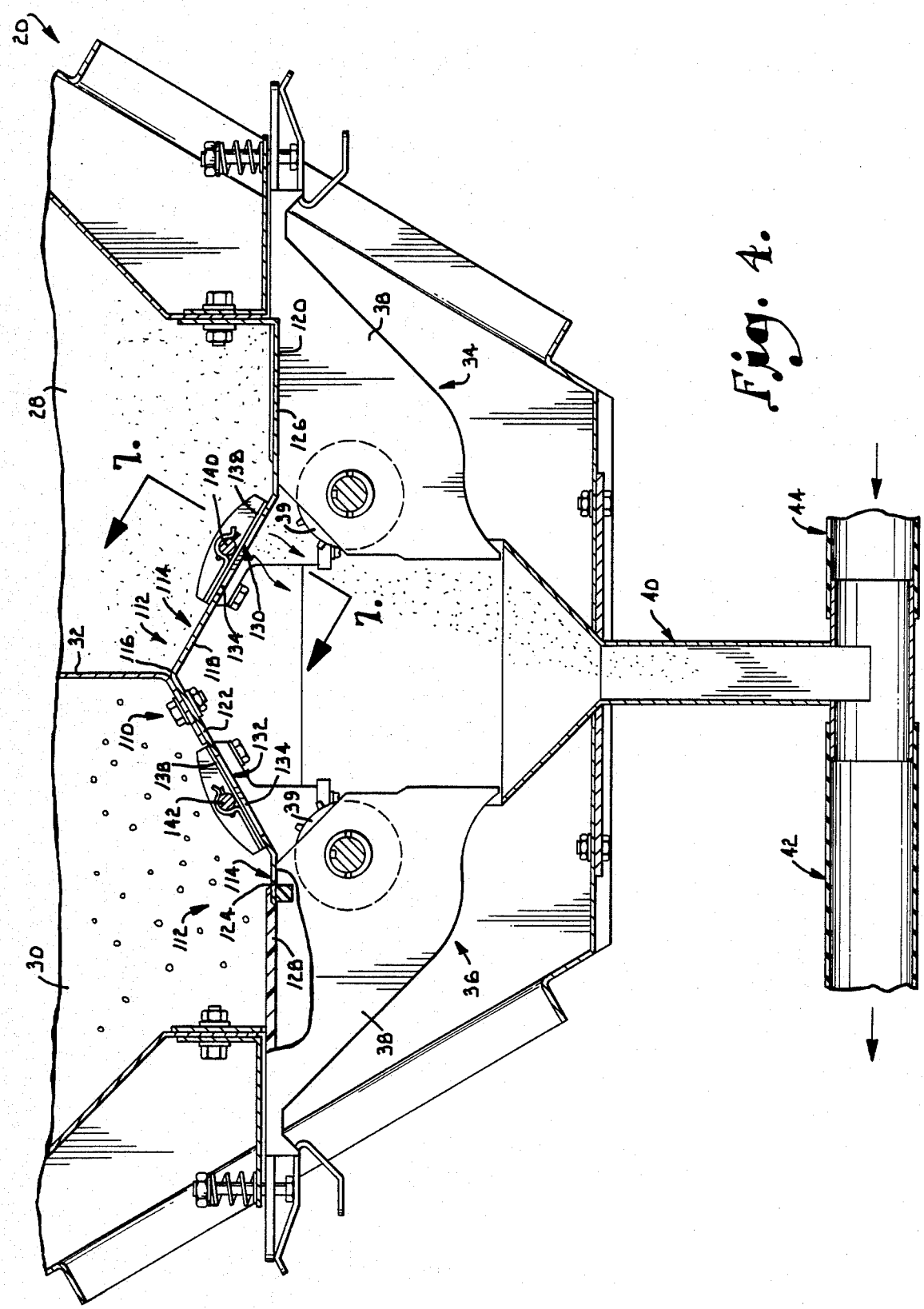
FIG. 4 is a fragmentary, vertical, cross-sectional view of seed hopper and seed cups depending therefrom having portions cut away for viewing therein.

As shown in FIG. 4, the hopper 20 is subdivided into two fore-and-aft sections 28,30 by a vertical laterally extending internal partition 32 so that the hopper 20 can carry a supply of two separate and distinct types of materials, such as seeds in front section 28 and granular fertilizer in rear section 30.

Two horizontal lines 34,36 of seed cups 38 (shown in vertical cross-section in FIG. 4) are located on opposite sides of the hopper 20 adjacent the bottom of the latter for controlling distribution of the contents of the hopper 20. Only one cup is shown from each line 34,36, but it will be understood that each line contains a series of side-by-side cups extending across the width of the hopper 20. Line 34 of cups 38 communicates at its upper end with the interior of hopper section 28, and line 36 of cups 38 communicates at its upper end with the interior of hopper section 30. Each cup has a metering rotor 39 therein for metering materials therefrom. The cups 38 of line 34 are opposed fore-and-aft by the corresponding cups 38 of line 36 (one such pair is shown in FIG. 4), and each pair of opposed fore-and-aft cups shares a common funnel 40 into which either of the two cups may discharge metered volumes of materials. Each funnel 40, in turn, dumps into a transfer conduit 42 leading to the furrow openers 26 for ultimate distribution of the metered materials to the ground. An air supply line 44 leads from a blower 46 and is in communication with the upstream ends of the transfer conduits 42 for delivering a stream of air thereto, the conduits 42 lying side-by-side in a substantially horizontal plane underneath and across the width of the hopper 20.

At the downstream ends of transfer conduits 42, a coupling assembly 48 releasably connects and communicates conduits 42 with delivery conduits 50 on the trailing cultivator 22. As shown in FIG. 3, part of the coupling assembly 48 includes a mounting plate member 52 which has a plurality of cylindrical fittings 54 that telescopically receive the downstream ends of the transfer conduits 42. The mounting plate 52 serves as a means for grouping the transfer conduits 42 together for movement as a unit when conduits 42 are detached from conduits 50 as will be explained below. Ring clamps 56 tightly clamp the conduits 42 onto the fittings 54 in air-tight sealing engagement therewith.

A pair of over-center locking clamps 58 (only one being illustrated) on the plate 52 releasably lock the plate 52 against a receiving panel 60 of the coupling assembly 48 for communication of the transfer conduits 42 with the corresponding plurality of delivery conduits 50. Each locking clamp 58 includes a handle 62 swingable about an upright pivot 64 on the side of the plate 52 and horizontally swingable, hook-shaped latching finger 66 coupled with the handle 62 intermediate its ends. The fingers 66 hook around the sides of the panel 60 for releasably maintaining the plate 52 and the panel 60 in tight interengagement.

Each of the delivery conduits 50 leads to a corresponding corrugated pipe 68 which in turn leads to a distributor 70 for dividing its particular air-entrained seed stream into a plurality of substantially uniform, smaller air-entrained seed streams. The smaller streams then enter and travel through hoses 72 (FIG. 2), exiting the downstream ends thereof behind the furrow openers 26 and into furrows in the ground.

A cyclone separator 74 is carried by the frame 24 and is disposed for being selectively coupled with the plate 52 for receiving the seed streams from the transfer conduits 42. As illustrated best in FIG. 3, the separator 74 includes a tapered inlet throat 76 having a substantially vertical, rectangular mounting plate 78 at its entry end. Vertical flange strips 80 are attached to the opposite lateral edges of the plate 78 to facilitate clamping of the plate 52 against plate 78 by locking clamps 58 in the same manner as plate 52 is normally clamped against panel 60. A pair of laterally spaced apart support tabs 82 extend outwardly from a lower portion of the plate 78. A rectangular inlet 84 is provided in the plate 78 for permitting the passage of seed streams therethrough and into throat 76.

The throat 76 is attached at its inner end to a vertical, cylindrical wall 86 of a separation chamber 88 and includes two laterally spaced apart sidewalls 90,92 which converge rearwardly as wall 86 is approached. Each of the sidewalls 90,92 substantially tangentially intersects the cylindrical chamber wall 86. A pair of vertically spaced apart, substantially horizontal walls 94,96 interconnect the sidewalls 90,92. The chamber 88 has a horizontal top wall 98 which has a centrally located circular opening 100 covered by a screen 102 for permitting air flow but preventing seed passage therethrough.

The cyclone separator 74 further includes a conical funnel 104 which depends from the cylindrical wall 86 and converges downwardly from the cylindrical wall 86 and converges downwardly to a seed outlet 106. A bracket 108 attaches the separator 74 to a forward portion of the cultivator frame 24.

A dump gate assembly 110 (FIGS. 4, 5, 7 and 8) extends laterally across a lower portion of the hopper sections 28,30 above the lines of seed cups 34,36 and includes an elongated tray 112 which extends across the width of the hopper 20 and provides a bottom for the hopper sections 28,30 for restricting the flow of seeds therefrom. The tray 112 has an upwardly convex floor 114 which has a longitudinally extending, centrally located apex 116. As illustrated in FIG. 4, the partition 32 is attached to the floor 114 and extends upwardly from the apex 116.

The floor 114 has a front sloping portion 118 which slopes downwardly and forwardly from the apex 116 and which leads to a front horizontal portion 120. The front sloping portion 118 and the front horizontal portion 120 form the bottom of the front hopper section 28. Similarly, the floor has a rear sloping portion 122 which slopes downwardly and rearwardly from the apex 116 and leads to a rear horizontal portion 124. The rear sloping portion 122 and the rear horizontal portion 124 form the bottom of the rear hopper section 30. The front horizontal portion 120 has a series of delivery ports 126 which are in vertical registration with the seed cups 38 of line 34 for delivering a supply of seeds thereto for metering. Likewise, the rear horizontal portion 124 has a series of delivery ports 128 which are in vertical registration with the seed cups 38 of line 36. Each sloping portion 118,122 has a corresponding series 130,132 of drainage apertures 124, respectively, which extends along the length of the tray for permitting rapid drainage of the hopper sections 28,30. Plugs 136 permanently block off certain of the drainage apertures for preventing drainage therethrough, the particular apertures 134 selected for permanent block-off depending upon the number and position of the transfer lines 42 provided on the planter in question. The remaining apertures 134 have cover plates 138 associated therewith for slidably covering and uncovering the drainage apertures 134. Each series of apertures 130,132 has a rod 140,142, respectively, associated therewith for interconnecting the cover plates 138 of the series 130,132. A pair of laterally spaced apart U-shaped guides 144 are fixed to each sloping portion 118, 122 and receive the rod 140,142 associated with that sloping portion 118,122 so as to limit the rod 140,142 to longitudinal shifting movement. An end of each rod 140,142 passes through a sidewall 146,148, respectively, and is pivotally attached to an intermediate portion of a corresponding lever 150,152. An end of each of the levers 150,152 is pivotally attached to a corresponding tray sidewall 146,148. The tray has a pair of latches 154 at opposite ends thereof which are pivotally mounted onto the tray 112 for locking the levers 150,152 into a stowed position wherein the cover plates 138 are all shifted so as to cover their respective drainage apertures 134.

OPERATION

In use, either the front or rear section of the hopper 20 is initially filled with seed or granular fertilizer and the corresponding front or rear line of cups 34,36 will be used to meter the particles from the hopper as the seeder 10 and cultivator 22 are drawn across the field. It is also possible to fill the front and rear sections 28,30 with different types of particles and meter simultaneously from both the front and rear lines 34,36 of cups 38.

During planting, the seeds gravitate from the hopper 20 into the cups 38 and are subjected to the metering rotors 39 which deliver metered streams therefrom into the funnels 40 and then on into the transfer conduits 42. Forced air from the blower 46 entrains the seed streams and carries them downstream through the downstream ends of the conduits 42. Each air-entrained seed stream remains separate and distinct from the other seed streams as the streams flow from the conduits 42, through coupling assembly 48, and into the delivery conduits 50. Each seed stream then flows through its delivery conduit 50 and into and through its corresponding corrugated pipe 68 and corresponding distributor 70. Each air-entrained seed stream is then divided by its distributor 70 into a plurality of smaller uniform seed streams which flow through hoses 72 to the ground behind the furrow openers 26.

After planting, a supply of unspent seeds is usually present in the hopper. In order to purge the hopper of its unspent contents, coupling assembly 48 is released to disconnect the plate 52 from the panel 60. The plate 52 with its attached conduits 42 is then moved over to and is attached upon the separator 74 so that the transfer conduits 42 are in communication with the inlet 84 of the mounting plate 78. Plate 52 is easily placed in such location by positioning the plate 52 above the mounting plate 78 and moving the plate 52 downward so as to track retaining elements 156 around the strips 80 until the lowermost edge of the plate 52 engages the support tabs 82. The plate 52 can then be locked into communicative engagement with the mounting plate 78 by hooking the fingers 66 of locking clamps 58 behind the strips 80 and pivoting the handles 62 forwardly until the handles 62 are brought over-center into a fore-and-aft position.

A collection auger 158 should then be placed beneath the outlet 106 of the cyclone separator 74 so as to collect and transport purged material to a remote location. Materials from hopper section 28 can be purged therefrom by unlatching the lever 150 and pivoting the same outwardly from the tray 112, thereby shifting the rod 140 lengthwise so as to similarly shift the cover plates 138 off the series 130 of drainage apertures 134. Uncovering the drainage apertues 134 of front series 130 permits gravitational drainage of material from the hopper section 28. The drained materials thus bypass the seed cups 34 and the rotors 39 and gravitionally flow rapidly into the funnels 40 and on into the transfer conduits 42. Air fom the blower 46 then entrains the materials and carries them rearwardly through the transfer conduits 42, through the cylindrical fittings 54 of the plate 52 and on into the throat 76 of the cyclone separator 74.

The separate streams combine into a single stream within the throat 76 which becomes progressively narrowed and is caused to flow tangentially along the inside of the cylindrical wall 86 of the chamber 88. The combined stream then flows substantially horizontally along the vertical cylindrical wall 86, thereby causing the stream to move in a circular swirling fashion. Air from the air-entrained seed stream escapes upwardly through the screen 102 of the opening 100, while the velocity of the seeds is reduced by frictional forces exerted by the cylindrical wall 86 upon the seeds. As the velocity of the seeds decreases, gravity forces the seeds to drop from the chamber 88 and into the conical funnel 104. The seeds then swirl downwardly through the conical funnel 104 and through the outlet 106 and from the cyclone separator 74 into the auger 158, whereupon they are transported to suitable locations for collection and storage.

Similarly, material can be drained from the rear section 30 of the hopper 20 by unlatching the lever 152 and shifting the same outwardly so as to uncover the series 132 of drain apertures 134. This action allows materials to drain from the rear hopper section 30 into the common funnels 40 and on into the transfer conduits 42 wherein the materials are entrained by air and carried rearwardly to the cyclone separator 74. The air-entrained seed streams are there combined into one stream and relieved of their seed content as described above.

We claim:

1. In a farm implement for having apparatus for containing a supply of particles to be dispensed, metering means for delivering a plurality of metered particle streams from said apparatus, a plurality of transfer conduits for receiving said plurality of particle streams, an air blower in upstream communication with said transfer conduits for providing a particle entraining stream of air for entraining said particle streams and conveying said particles downstream through said transfer conduits, a plurality of delivery conduits in downstream communication with said transfer conduits for delivering said air-entrained particle streams to the ground, the improvement comprising:

an air-particle separator;
   means for selectively, temporarily disconnecting said transfer conduits from said delivery conduits;
   means for temporarily connecting said transfer conduits to said separator; and
   a drainage control assembly for selectively bypassing said metering means and permitting gravitational flow of particles from said apparatus to said transfer conduits.

2. In the invention of claim 1, said drainage control assembly comprising:

a floor forming the bottom of said apparatus, said floor having a plurality of delivery ports in vertical registration with said metering means for permitting the gravitational flow of particles thereto from said apparatus,
   said floor having a plurality of apertures in vertical registration with said transfer conduits for the gravitational flow of seeds from said apparatus into said transfer conduits having bypassed said metering means;
   means for covering said apertures for preventing drainage therethrough; and
   means for selectively moving said covering means so as to simultaneously uncover said apertures thereby permitting the gravitational drainage of seeds through said apertures.

3. In the invention of claim 2, wherein said covering means is a plurality of covering plates overlying said apertures.

4. In the invention of claim 3, said apertures being aligned in a series across said apparatus.

5. In the invention of claim 4, said uncovering means includes a rod interconnecting said cover plates, said rod having a longitudinal axis, means for guiding said rod for restricting said rod to movement along said longitudinal axis.

6. In the invention of claim 5, said uncovering means further including a lever pivotally attached to one end of said rod intermediate the ends of said lever, one end of said lever being provided with a fulcrum.

7. In a farm implement having apparatus for containing a supply of particles to be dispensed, metering means for delivering a plurality of metered particle streams from said apparatus, a plurality of transfer conduits for receiving said plurality of particle streams, an air blower in upstream communication with said transfer conduits for providing a particle entraining stream of air for entraining said particle streams and conveying said particles downstream through said transfer conduits, a plurality of delivery conduits connected in downstream communication with said transfer conduits for delivering said air-entrained particle streams to the ground, the improvement comprising:

a cyclone separator; and means for selectively disconnecting the transfer conduits from said delivery conduits and connecting the transfer conduits with said separator for the delivery of air-entrained particle streams thereto.

8. In the invention of claim 7, said cyclone separator comprising:

a throat for receiving the air-entrained particle streams from said transfer conduits;

a chamber in downstream communication with said throat, said chamber having a cylindrical wall, said throat having a pair of spaced apart, downstream converging walls, said throat walls being substantially tangentially aligned with said cylindrical wall for directing the air-entrained seed stream along the interior of said cylindrical wall.

9. In the invention of claim 8, wherein said chamber has a top wall, said top wall having an opening covered by a screen for permitting the flow of air therethrough to the atmosphere but preventing the passage of seeds therethrough.

10. In the invention of claim 9, wherein said cyclone separator includes a funnel depending from said chamber for directing the flow of seeds from said chamber.

11. In the invention of claim 10, said invention further comprising:

means for collecting and transporting the seeds from said funnel.

12. In the invention of claim 8, wherein said cylindrical wall is substantially vertical, said throat walls being substantially vertical.

13. In the invention of claim 12, wherein said throat walls are interconnected by a pair of vertically spaced apart horizontal walls.

14. In the invention of claim 7; a drainage control assembly associated with said apparatus for permitting selective bypass of said metering means for gravitation of particles directly to the transfer conduits.

* * * * *